United States Patent [19]

Frund

[11] Patent Number: 5,714,126
[45] Date of Patent: Feb. 3, 1998

[54] RESPIRATOR FILTER SYSTEM

[75] Inventor: Zane N. Frund, Cranberry Township, Pa.

[73] Assignee: Mine Safety Appliances Company, Pittsburgh, Pa.

[21] Appl. No.: 701,538

[22] Filed: Aug. 22, 1996

Related U.S. Application Data

[63] Continuation of Ser. No. 379,877, Jan. 27, 1995, abandoned.

[51] Int. Cl.$^6$ .................... A62B 7/10; B01D 50/00
[52] U.S. Cl. .................... 422/122; 55/482; 55/485; 55/524; 55/DIG. 33; 96/132; 96/135; 502/417
[58] Field of Search .................... 422/120, 122; 502/417; 55/482, 483, 485, 486, 522, 524, DIG. 33; 96/131, 132, 135

[56] References Cited

U.S. PATENT DOCUMENTS

| | | | |
|---|---|---|---|
| 1,519,470 | 12/1924 | Wilson et al. | 502/417 |
| 2,920,051 | 1/1960 | Wiig et al. | 422/122 X |
| 3,355,317 | 11/1967 | Keith, II et al. | 427/215 |
| 3,890,245 | 6/1975 | Berg et al. | 502/5 |
| 4,098,270 | 7/1978 | Dolby | 128/206.12 |
| 4,236,902 | 12/1980 | Fricke | 422/122 X |
| 4,838,901 | 6/1989 | Schmidt et al. | 95/90 |
| 4,867,770 | 9/1989 | Feeney | 422/122 X |
| 4,883,052 | 11/1989 | Weiss et al. | 128/205.27 |
| 5,192,735 | 3/1993 | Pagotto et al. | 502/417 |
| 5,270,017 | 12/1993 | Schwartz, Jr. | 422/209 |
| 5,275,154 | 1/1994 | Von Blucher et al. | 128/205.27 |
| 5,315,987 | 5/1994 | Swann | 128/201.28 |

FOREIGN PATENT DOCUMENTS

| | | |
|---|---|---|
| 339487 | 11/1989 | European Pat. Off. . |
| 405404 | 1/1991 | European Pat. Off. . |
| 465371 | 1/1992 | European Pat. Off. . |
| 93/10896 | 6/1993 | WIPO . |

*Primary Examiner*—Robert J. Warden
*Assistant Examiner*—E. Leigh Dawson
*Attorney, Agent, or Firm*—James G. Uber; Henry E. Bartony, Jr.

[57] ABSTRACT

The present invention provides a respirator filter system suitable for filtering toxic agents, including organic vapors, acid gases, formaldehyde, ammonia, and methylamine as well as pesticides, CS and CN tear gases, dusts, mists, fumes and radionuclides from environmental air to be respired by a user of the filter system. In general, the filter system of the present invention includes a cartridge containing a layer of an unimpregnated activated carbon, a layer of an activated carbon impregnated with sulfate, molybdenum and at least one impregnate selected from the group consisting of copper and zinc, and a HEPA filter. Cartridges containing these adsorbents or adsorbents similar to them (in carbon tetrachloride activity and chemistry) have been discovered to be uniquely capable of filtering a broad range of toxic agents.

6 Claims, 3 Drawing Sheets

RESPIRATOR FILTER SYSTEM

This application is a continuation of application Ser. No. 08/379,877 filed on Jan. 27, 1995, now abandoned.

FIELD OF THE INVENTION

The present invention relates to respirator filter systems and, in particular, to respirator cartridges suitable for use in environments containing numerous types of toxic agents.

BACKGROUND OF THE INVENTION

Air-purifying respirators equipped with filter systems such as chemical cartridges have been used for decades to protect the respiratory system of individuals from noxious gases, vapors, fumes and particulates. Typically, respirator manufacturers in the United States produce chemical cartridges approved by the National Institute of Occupational Safety and Health (NIOSH) for either a single type of toxic agent (for example, pesticide, organic vapor, acid gas or formaldehyde) or for multiple types of toxic agents (for example, organic vapors and acid gases, ammonia and methylamine, or acid gases and formaldehyde). Similarly, respirator manufacturers around the world produce chemical cartridges for approval by appropriate regional or national regulatory agencies such as NIOSH or CEN.

Generally, these cartridges contain adsorbents such as activated carbon (for example, coal-, peat- or coconut-based activated carbon) for the physical adsorption of toxic agents such as organic vapors, and/or various types of impregnated carbons (for example, sodium hydroxide, potassium iodide and zinc chloride impregnated carbon) for the chemisorption of toxic agents such as acid gases, formaldehyde, ammonia and methylamine.

Several respirator manufacturers, in an attempt to broaden the range of toxic agents against which respirator filter systems are effective, produce "dual fill" cartridges comprising a layer of an activated carbon and a layer of impregnated activated carbon. For example, Mine Safety Appliances Company (MSA) of Pittsburgh, Pa. produces a GMF filter system suitable for use in atmospheres containing organic vapors, acid gases and formaldehyde.

However, no single type of air-purifying respirator filter system is currently available which is capable of filtering a broad range of toxic agents, including organic vapors, acid gases, formaldehyde, ammonia, methylamine and pesticides, well enough to meet NIOSH requirements. A cartridge which adsorbs all of the aforementioned toxic agents would be very valuable to individuals potentially exposed to a myriad of toxic compounds as, for example, in the agricultural industry.

SUMMARY OF THE INVENTION

Accordingly, the present invention provides a filter system suitable for filtering a broad range of toxic agents, including, for example, organic vapors, acid gases (for example, chlorine, chlorine dioxide, hydrogen chloride, hydrogen sulfate and sulfur dioxide), formaldehyde, ammonia and methylamine from environmental air to be respired by a user of the filter system. The air-purifying filter systems of the present invention comprise containers or cartridges containing a novel mixture, ratio, and arrangement of chemical adsorbents.

In general, the cartridges of the present invention contain a layer of an unimpregnated activated carbon preferably having a carbon tetrachloride activity of at least 85 and a layer of an activated carbon impregnated with a sulfate compound, a molybdenum compound and at least one compound selected from the group consisting of a copper compound and a zinc compound. More preferably, the unimpregnated activated carbon has a carbon tetrachloride activity of at least 95.

Preferably, the impregnated carbon should include by weight: up to 10% sulfate and up to 10% molybdenum and at least one impregnate selected from the group of copper and zinc, wherein the copper is present in an amount from about 0.0 to 20% and the zinc is present in an amount from about 0.0 to 20%. Cartridges containing such adsorbents or adsorbents similar to them in carbon tetrachloride activity and chemistry have been discovered to be uniquely capable of filtering a wide range of toxic agents much broader than that of any existing cartridge.

Preferably, in the respirator cartridge filter systems of the present invention, there is at least 20 cc of activated carbon in the layer of unimpregnated activated carbon and at least 80 cc of impregnated carbon in the layer of impregnated activated carbon. More preferably, there is at least 26 cc of the activated carbon and at least 87 cc of the impregnated carbon present in the activated carbon layer and the impregnated carbon layer, respectively. Preferably, the unimpregnated carbon is placed downstream from the impregnated carbon. The respirator cartridges of the present invention meet all the NIOSH requirements for organic vapors, acid gases, formaldehyde, ammonia and methylamine. Moreover, when the cartridges of the present invention are equipped with a high-efficiency particulate (HEPA) filter, the present cartridges also meet the NIOSH requirements for pesticides, CS and CN tear gases, dusts, fumes, radionuclides, lacquers and enamel mists. No existing respirator cartridge meets all of these NIOSH requirements.

As set forth in Title 30, Part 11 of the United States Code of Federal Regulations and as used herein, the term "vapor" means the gaseous state of a substance that is solid or liquid at ordinary temperature and pressure. The term "gas" means an aeriform fluid which is in a gaseous state at ordinary temperature and pressure. The term "facepiece" refers to a respirator component designed to provide a gas-tight or dust-tight fit with the face and may include headbands, valves, and connections for canisters, cartridges, filters, or a respirable gas source. The term "dust" means a solid mechanically produced particle with a size ranging from submicroscopic to macroscopic. The term "fume" means a solid condensation particle, generally less than 1 micrometer in diameter. The term "mist" means a liquid condensation particle with a size ranging from submicroscopic to macroscopic.

The term "pesticide" means (1) any substance or mixture of substances (including solvents and impurities) intended to prevent, destroy, repel, or mitigate any insect, rodent, nematode, fungus, weed, or other form of plant or animal life or virus, and (2) any substance or mixture of substances (including solvents and impurities) intended for use as a plant regulator, defoliant, or desiccant, as defined in the Federal Insecticide, Fungicide, and Rodenticide Act of 1947, as amended (7 U.S.C. §§135-135k), excluding fumigants with are applied as gases or vapors or in a solid or liquid form as pellets or poured liquids for subsequent release as gases or vapors.

The term "radionuclide" means an atom identified by the constitution of its nucleus (specified by the number of protons Z, number of neutrons N, and energy or, alternatively, by the atomic number, mass number $A=(N+Z)$,

DETAILED DESCRIPTION OF THE PRESENT INVENTION

The respirator filter systems of the present invention can vary widely in shape (for example, round, rectangular, oval, etc.) and size (including, fill volume), depending upon their materials of construction and the performance criteria (for example, the desired service time and the desired breathing resistance, and the amount of dust, mist and fumes to be removed from an airstream). However, the geometry and size of the respirator cartridge should not obstruct the wearer's eyesight when mounted on the respirator facepiece. In general, it is desirable to minimize the volume of carbon used in the filter system while maximizing the gas life of the filter system.

Figure 1:
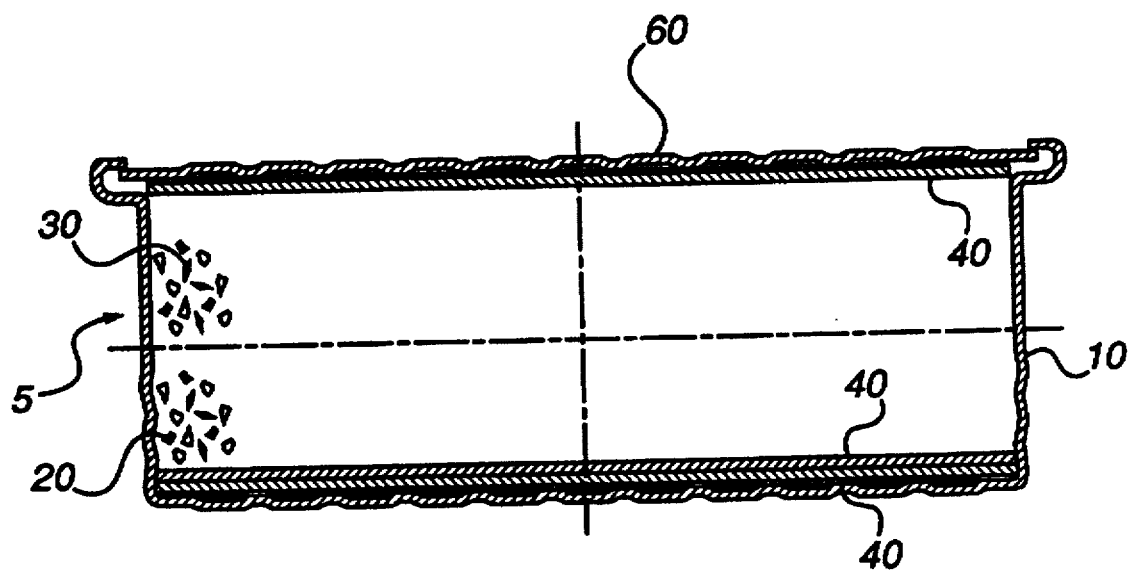
FIG. 1 illustrates in cross-section an embodiment of a respirator cartridge of the present invention.
Figure 1A:
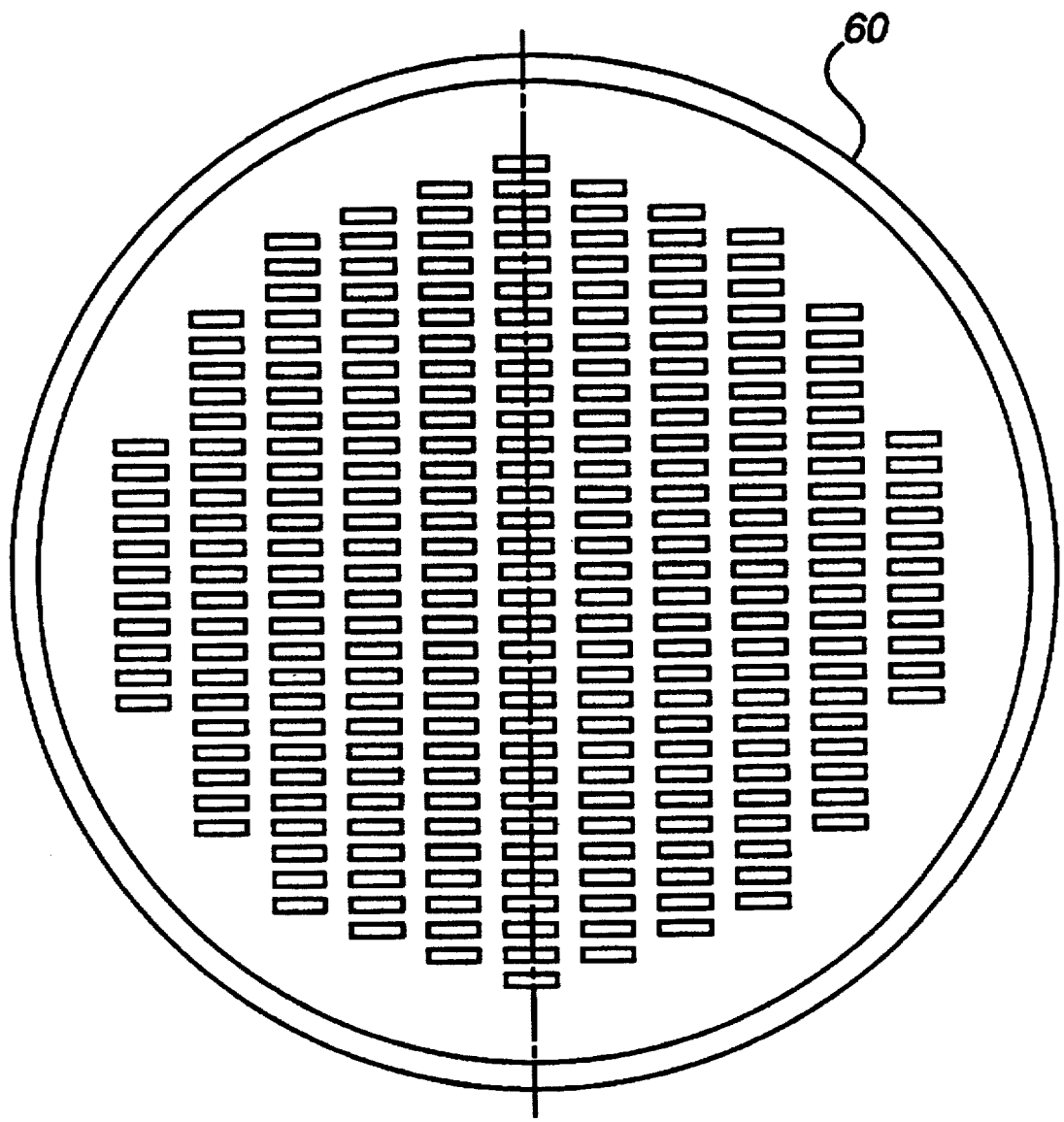
FIG. 1A is a top plan view of a lid for the respirator cartridge of FIG. 1.
Figure 2:
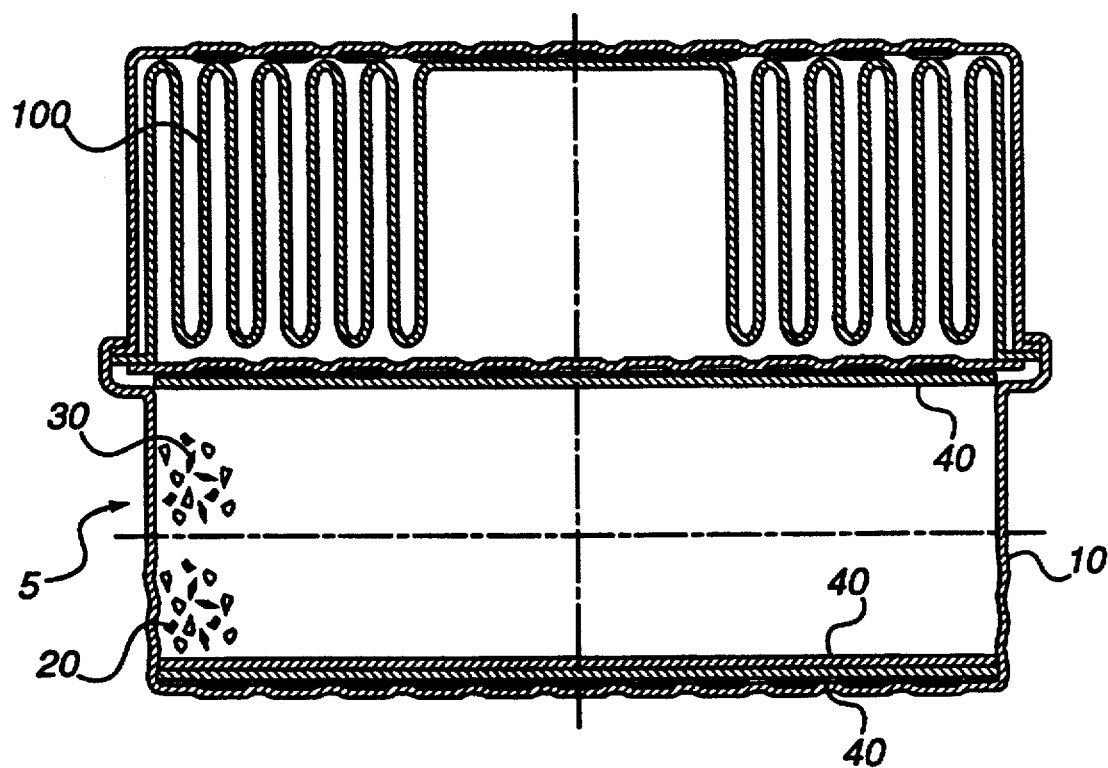
FIG. 2 illustrates in cross-section an embodiment a respirator cartridge of the present invention including a high-efficiency particulate filter.

FIGS. 1 and 2 illustrate two preferred embodiments of the present respirator filter system. As illustrated, cartridge 5 comprises a round cartridge body 10. Examples of suitable cartridge bodies 10 include the Advantage® cartridges or Comfo® cartridges available from Mine Safety Appliances Company of Pittsburgh, Pa. See Mine Safety Appliances Company Data Sheet Nos. 10-02-03, 10-02-04 and 10-02-05.

Pica USA G215D and Calgon Carbon URC are examples of an unimpregnated activated carbon and an impregnated activated carbon, respectively, suitable for use in the present invention. The physical and chemical characteristics of a commercially available Pica USA G215D carbon and a commercially available Calgon Carbon URC carbon used in the present studies are presented in Table 1.

Calgon Carbon URC is the subject of Patent Cooperation Treaty International Application No. PCT/US92/10216, the disclosure of which is incorporated herein by reference. Adsorbents having a carbon tetrachloride activity and chemistry similar to these adsorbents should also be suitable for use in the respirator cartridges of the present invention.

TABLE 1

CHARACTERISTICS OF UNIMPREGNATED AND IMPREGNATED CARBONS

|  | Unimpregnated Carbon | Impregnated Carbon |
|---|---|---|
| Base Carbon | coconut | coal |
| Carbon Tetrachloride Activity | 85+ | 60+ |
| Mesh Size | 12 × 20 | 12 × 30 |
| Apparent Density gm/cc | 0.42 | 0.66 |
| Impregnates | none | 12% copper<br>7% ammonium sulfate<br>6% ammonium dimolybdate |
| Supplier | Pica USA G215D | Calgon Carbon URC |

Calgon Carbon URC impregnated activated carbon is known to be somewhat effective in the removal of organic vapors, acid gases, formaldehyde, ammonia and methylamine. Such impregnated carbon may comprise by weight: up to 10% sulfate and up to 10% molybdenum and at least one impregnate selected from the group of copper and zinc, wherein the copper is present in an amount from 0.0 to about 20% and the zinc is present in an amount from about 0.0 to 20%.

The Pica USA G215D and Calgon Carbon URC adsorbents were selected over other adsorbents for use in the present invention because of several advantages, including (i) a large surface area and micropore volume, and thus a high absorptive capacity for organic compounds, (ii) the ability after impregnation as described above to chemically adsorb a wide range of toxic agents, and (iii) an acceptable breathing resistance (pressure drop) when placed in a cartridge.

To meet current NIOSH gas life requirements for organic vapors, acid gases, formaldehyde, ammonia, methylamine, cartridge 5 must contain a layer 20 of at least approximately 20 cc of an activated carbon having a carbon tetrachloride activity of at least 85 (more preferably, of at least 95), and a layer 30 of at least approximately 80 cc of a carbon impregnated with sulfate, molybdenum and at least one impregnate selected from a group consisting of copper and zinc. When present in these amounts, the layer of unimpregnated carbon is preferably placed downstream of the layer of impregnated carbon to meet NIOSH requirements. To contain the adsorbent bed, cotton or synthetic filter pads 40 are preferably placed underneath and on top of the adsorbent bed.

If protection against dusts, fumes, mists (for example, lacquers and enamel mists) and/or radionuclides is desired or required, a high efficiency particulate (HEPA) filter 100 (for example, a pleated, electrostatic or conical-shaped filter) can be attached to the top (that is, to the inlet side) of cartridge 5.

Further, present NIOSH requirements require a HEPA filter for NIOSH approval against both pesticides and tear gases. Satisfaction of the NIOSH requirements for both pesticides and tear gases in a single filter system thus requires both a carbon bed as describe above and a HEPA filter.

Examples of a suitable HEPA filters for use in the present invention include (i) MSA HEPA filters, which are fabricated from a non-woven blend of microglass and synthetic fibers, and (ii) electrostatic HEPA filter media, such as the Web Dynamics WD2210 synthetic filter media. In general, HEPA filters suitable for use in the present invention are preferably at least 99.97 percent efficient against 0.3 micron dioctyl phthalate (DOP) aerosol particles.

To construct cartridge 5, at least one filter pad 40 is preferably placed in the bottom of cartridge 5. More preferably, at least two filter pads 40 are placed in the bottom of cartridge 5. At least approximately 20 cc of the unimpregnated carbon 20 followed by at least approximately 80 cc of the impregnated carbon 30 are then measured and preferably "sifter or vibratory" filled (as known in the art) on top of bottom filter pad(s) 40. At least one filter pad 40 is then placed on top of the impregnated carbon bed. Suitable filter pads are available, for example, from American Felt and Fiber. Finally, a porous (for example, louvered) lid 60 is placed on the top of cartridge 5 and sealed thereon. This procedure compacts the chemical bed, and maintains a suitable bed pressure (that is, a pressure suitable to prevent movement of the carbon bed within cartridge 5).

In cases in which cartridge 5 must also protect against pesticides, tear gases, dusts, fumes, mists and/or radionuclides, a non-woven, high efficiency particulate filter 100 is preferably attached to the top of cartridge 5 as shown in FIG. 2.

PERFORMANCE

The present cartridges were tested against the regiment and requirements established by NIOSH as set forth in Tables 2, 3 and 4. Approval by NIOSH is a necessary prerequisite for a respirator cartridge to be commercially viable in the United States. The NIOSH requirements and testing conditions are detailed in Title 30, Part 11 of the Code of Federal Regulations, the disclosure of which is incorporate herein by reference.

The "gas life" of a cartridge is defined as the time that a cartridge is challenged with a specified contaminant until the contaminant "breaks through" the cartridge and is detected in the effluent airstream at a predetermined "breakthrough concentration". The breakthrough concentration of the contaminant is usually its threshold limit value (TLV). The "breathing resistance" is defined as the pressure drop of air flowing through the cartridge at a fixed flow rate. The "challenge agent penetration" is defined as the mass or percentage of challenge particles which are not filtered by the cartridge.

TABLE 2

NIOSH GAS LIFE TESTING CONDITIONS AND REQUIREMENTS

| Test Agent | Challenge Concentration (ppm) | Breakthrough Concentration (ppm) | Minimum Required Gas Life (min.) |
|---|---|---|---|
| $CCl_4$ | 1000 | 5 | 50 |
| $SO_2$ | 500 | 5 | 15 |
| HCl | 500 | 5 | 25 |
| $Cl_2$ | 500 | 5 | 17.5 |
| $ClO_2$ | 500 | 0.1 | 30 |
| $H_2S$ | 1000 | 10 | 30 |
| HCN | 500 | 5 | 30 |
| $CH_2O$ | 100 | 1 | 50 |
| $NH_3$ | 1000 | 50 | 25 |
| $CH_3NH_2$ | 1000 | 10 | 12.5 |
| HF | 70 | 3 | 30 |
| CS TEAR GAS | 3 | 0.05 | 480 |
| CN TEAR GAS | 16 | 0.05 | 480 |

TABLE 3

NIOSH HIGH EFFICIENCY FILTER TESTING CONDITIONS AND REQUIREMENTS

| Test Agent | Challenge Conditions | Maximum Allowable Challenge Agent Penetration |
|---|---|---|
| Dioctyl phthalate (DOP) penetration | 100 µg/l of 0.3µ diameter DOP particles at 42.5 lpm for 10 seconds | 0.03% |
| Silica Dust Penetration | 60 mg/m³ of 0.4–0.6µ diameter silica particles at 16 lpm for 90 minutes | 1.5 mg |
| Silica Mist Penetration | 25 mg/m³ of 0.4–0.6µ diameter silica particles at 16 lpm for 312 minutes | 2.5 mg |
| Lead Fumes Penetration | 20 mg/m³ of lead particles at 16 lpm for 312 minutes | 1.5 mg |

TABLE 4

NIOSH BREATHING RESISTANCE TEST CONDITIONS AND REQUIREMENTS

| | Chemical Cartridge | Chemical Cartridge with HEPA |
|---|---|---|
| Maximum Breathing Resistance at 42.5 lpm (mm $H_2O$) | 40 | 50 |

The performance of cartridges of the present invention in several experiments is presented in Tables 5 and 6. In the experiments represented in Tables 5 and 6, all cartridges were tested at an air flow rate, temperature and relative humidity of 32 lpm, 25° C. and 50% RH, respectively. MSA Comfo II and Advantage 100 cartridges were used in the experiments represented in Tables 5 and 6. The breathing resistance studies set forth in Table 6 were performed using MSA Comfo II and Advantage 100 cartridges both with and without MSA HEPA filters.

The MSA Comfo II and Advantage 100 cartridges have a fill volume in the range of approximately 115 to 120 cc. In the studies set forth in Tables 5 and 6, the Comfo II cartridges were filled with approximately 26 cc of the unimpregnated activated carbon and approximately 88 to 90 cc of the impregnated activated carbon. The Advantage 100 cartridges were filled with approximately 26 cc of the unimpregnated activated carbon and approximately 92 cc of the impregnated activated carbon.

All of the cartridges tested met the gas life and breathing resistance requirements set forth by NIOSH. Moreover, all the cartridges tested exhibited similar gas life performances. When a non-woven, HEPA filter 100 was incorporated into cartridge 5, as shown in FIG. 2, cartridge 5 also met the NIOSH requirements for pesticides, ortho-Chlorobenzylidene (CS) and alpha-Chloroacetophenone (CN) tear gases, dusts, mists, fumes and radionuclides. Furthermore, when tested at a phosphine ($PH_3$) challenge concentration of 1500 ppm (at 32 lpm, 50% RH and 25° C.), all the cartridges exhibited a gas life of 30+ minutes with a breakthrough concentration of 0.3 ppm.

TABLE 5

PERFORMANCE OF THE PRESENT CARTRIDGES AGAINST NIOSH TESTING CONDITIONS

| | Service Time Minutes | | |
|---|---|---|---|
| Test Agent | Without HEPA Filter | With HEPA Filter | Particulate Filter Penetration |
| $CCl_4$ | 65+ | 87+ | |
| $SO_2$ | 55+ | 57+ | |
| HCl | 80+ | 87+ | |
| $Cl_2$ | 150+ | 166+ | |
| $ClO_2$ | 70+ | 71+ | |
| $H_2S$ | 104+ | 110+ | |
| HCN | 40+ | 41+ | |
| $CH_2O$ | 66+ | 65+ | |
| $NH_3$ | 46+ | 48+ | |
| $CH_3NH_2$ | 36+ | 34+ | |
| HF | 150+ | 165+ | |
| DOP | | | 0.02% |
| Silica Dust | | | 1.00 mg |
| Silica Mist | | | 1.75 mg |
| Lead Fumes | | | 1.05 mg |

TABLE 6

BREATHING RESISTANCE OF CARTRIDGES

| | Comfo II Without HEPA Filter | Comfo II with HEPA Filter | Adv 100 Without HEPA Filter | Adv 100 with HEPA filter |
|---|---|---|---|---|
| Breathing Resistance at 42.5 lpm, (mm H20) | 26 | 40 | 20 | 35 |

Although the present invention has been described in detail in connection with the above examples, it is to be understood that such detail is solely for that purpose and that variations can be made by those skilled in the art without departing from the spirit of the invention except as it may be limited by the following claims.

What is claimed is:

1. A respirator cartridge for removing a broad range of toxic agents, including organic vapors, acid gases, formaldehyde, ammonia and methylamine, from gases to be breathed by a user of the respirator cartridge, the respirator cartridge comprising a layer of an adsorbing activated carbon, the respirator cartridge further comprising a layer of an adsorbing impregnated activated carbon, the impregnated activated carbon being impregnated with a sulfate compound, a molybdenum compound and at least one compound selected from the group consisting of a copper compound and a zinc compound, the layer of activated carbon comprising at least approximately 20 cc of the activated carbon, and the layer of the impregnated activated carbon comprising at least 80 cc of the impregnated activated carbon, the layer of activated carbon being positioned downstream from the layer of impregnated activated carbon with respect to the flow of gas through the respirator cartridge upon inhalation by the user thereof, the respirator cartridge having a fill volume of up to approximately 120 cc.

2. The respirator cartridge of claim 1 wherein the layer of activated carbon comprises at least 26 cc of the activated carbon and the layer of the impregnated activated carbon comprises at least 87 cc of the impregnated activated carbon.

3. The respirator cartridge of claim 1 wherein the activated carbon has a carbon tetrachloride activity of at least 85 on a weight/weight basis.

4. The respirator cartridge of claim 3 wherein the activated carbon has a carbon tetrachloride activity of at least 95 on a weight/weight basis.

5. The respirator cartridge of claim 1 wherein the impregnated carbon comprises by weight: up to 10% sulfate, up to 10% molybdenum, 0.0 to about 20% copper and 0.0 to about 20% zinc.

6. The respirator cartridge of claim 1 wherein the respirator cartridge further comprises a high efficiency particulate filter, the respirator cartridge being suitable to remove additional toxic agents, including dusts, fumes, radionuclides, lacquers, enamel mists, pesticides and tear gas.

* * * * *